(No Model.)
T. HARDING & E. JAMES.
TOBACCO CUTTER.
No. 457,531. Patented Aug. 11, 1891.
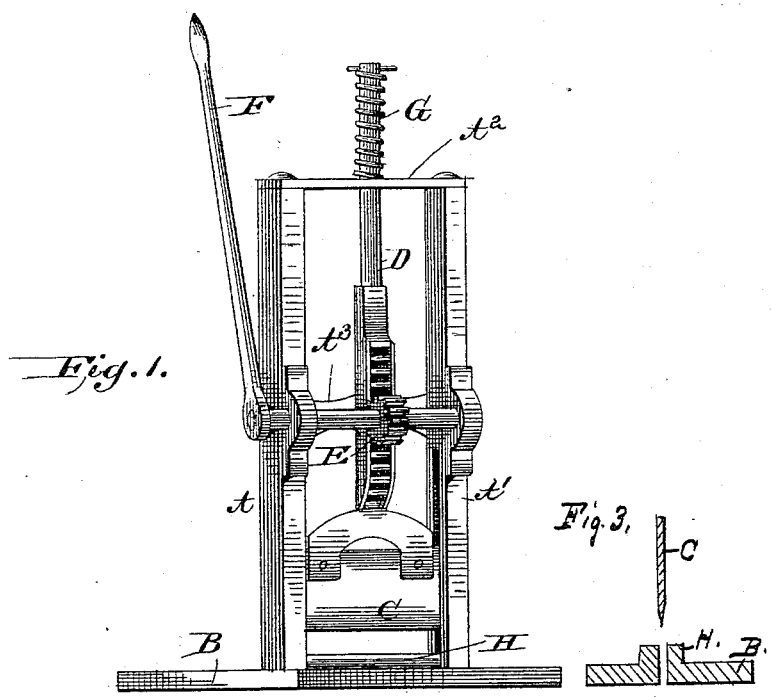
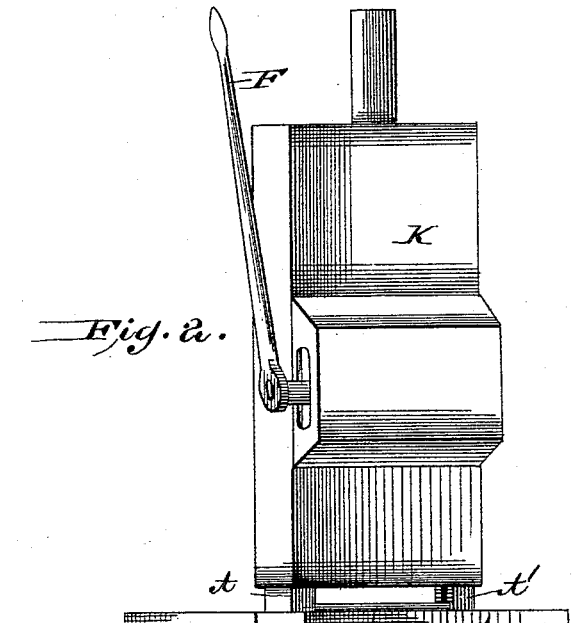
Witnesses:
Arthur Ashley,
Saml. J. Wallace,
Inventors
Thomas Harding
Edward James
by R. d. Sprague, atty.

UNITED STATES PATENT OFFICE.

THOMAS HARDING AND EDWARD JAMES, OF QUINCY, ILLINOIS; SAID JAMES ASSIGNOR TO THOMAS C. JOHNSON, OF SAME PLACE.

TOBACCO-CUTTER.

SPECIFICATION forming part of Letters Patent No. 457,531, dated August 11, 1891.

Application filed February 11, 1891. Serial No. 381,038. (No model.)

*To all whom it may concern:*

Be it known that we, THOMAS HARDING and EDWARD JAMES, of Quincy, in the county of Adams and State of Illinois, have invented certain new and useful Improvements in Tobacco-Cutters; and we do hereby declare the following to be a full, clear, and exact description of the same, reference being had to the accompanying drawings, forming a part of this specification, and to the letters of reference marked thereon.

This invention relates to improvements in tobacco-cutters such as are designed to stand upon a counter or shelf and employed to sever plug and other tobacco of small bulk, the object being to provide an exceedingly simple cutter capable of universal use and rough handling without getting out of order and composed of few and simple parts.

The invention therefore consists in certain novel details of construction and combinations and arrangements of parts to be now described, and pointed out particularly in the appended claims.

Referring to the accompanying drawings, Figure 1 is a perspective view of a cutter constructed in accordance with our invention. Fig. 2 is a similar view with the mechanism inclosed in a cover or casing. Fig. 3 is a detail section of the knife and block upon which the tobacco rests while being cut.

Like letters of reference indicate the same parts in all the figures.

On a suitable base B, adapted to stand upon a counter or shelf, is mounted an open framework consisting of the uprights A A', having the cross-piece $A^2$ at the top, and, if desired, an intermediate cross-piece $A^3$. In the inner sides of the uprights are formed slots or ways, into which the sides of the knife C project, whereby the knife is guided vertically, and in the top cross-piece $A^2$ a bearing is formed, through which a central rod or bar D slides, the lower end of said bar being bifurcated and connected rigidly to the knife, as will be readily understood by an inspection of Fig. 1. Just above the knife the bar has a series of teeth formed thereon constituting in effect a rack-bar, and meshing with these teeth is a pinion on a shaft E, journaled in bearings on the sides of the uprights and operated by means of a handle F to depress the knife and sever the tobacco placed beneath the same. The knife and movable parts are returned to normal or elevated position automatically by the spring G, coiled around the upper end of the bar D and bearing on the top cross-piece. During the cutting operation the tobacco rests on a surface, or, more properly speaking, two surfaces, H, between which the knife passes when the cut is completed to prevent injury to the cutting-edge. (See Fig. 3.) The whole of the mechanism may, if desired, be inclosed in a tight casing or cover, as shown in Fig. 2, a sufficient space being left beneath the casing for the passage of the tobacco.

The device, it will be seen, is simple and powerful in its operation and there is little or no danger of its getting out of order through rough handling or constant use.

What we claim as new is—

1. In a tobacco-cutter, the combination, with the base having the uprights mounted thereon, with the cross-piece at the top and the ways on the inner sides of the uprights, of the knife working in said ways, the bar connected rigidly to the knife and working through the top cross-piece, the rack-teeth on the bar, the cross-shaft and handle and the pinion on said shaft co-operating with the teeth on the bar to depress the knife, and the spring surrounding the bar for elevating the knife, substantially as described.

2. In a tobacco-cutter, the combination, with the base having the uprights mounted rigidly thereon, with the cross-piece at the top and the ways on the inner sides of the uprights, of the knife having its sides extending into said ways, the bar having the bifurcated lower end connected rigidly to the knife and working through a bearing in the top cross-piece, the rack-teeth on the bar, the cross-shaft journaled in the uprights, the pinion on the cross-shaft co-operating with the teeth on the bar, the operating-handle for depressing the knife, and the spiral spring surrounding the bar and bearing on the top cross-piece for elevating the knife, substantially as described.

THOMAS HARDING.
EDWARD JAMES.

Witnesses:
ALBERT W. WELLS,
THOS. W. MACFALL.